(12) United States Patent
Doerr et al.

(10) Patent No.: US 10,222,566 B1
(45) Date of Patent: Mar. 5, 2019

(54) OPTOELECTRONIC PACKAGE WITH PLUGGABLE FIBER ASSEMBLY

(71) Applicant: Acacia Communications, Inc., Maynard, MA (US)

(72) Inventors: Christopher Doerr, Middleton, NJ (US); Long Chen, Marlboro, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/991,242

(22) Filed: Jan. 8, 2016

Related U.S. Application Data

(60) Provisional application No. 62/100,980, filed on Jan. 8, 2015.

(51) Int. Cl.
  *G02B 6/42* (2006.01)
  *G02B 6/30* (2006.01)

(52) U.S. Cl.
  CPC ............. *G02B 6/4231* (2013.01); *G02B 6/30* (2013.01); *G02B 6/4221* (2013.01); *G02B 6/4227* (2013.01); *G02B 6/4238* (2013.01); *G02B 6/4239* (2013.01)

(58) Field of Classification Search
  CPC .......... G02B 6/30; G02B 6/42; G02B 6/4227; G02B 6/4231; G02B 6/4238; G02B 6/4239
  See application file for complete search history.

(56) References Cited

U.S. PATENT DOCUMENTS

| | | | | |
|---|---|---|---|---|
| 5,420,954 A * | 5/1995 | Swirhun | ............... | G02B 6/245 385/24 |
| 6,238,100 B1 * | 5/2001 | Sasaki | .................... | G02B 6/421 385/59 |
| 6,318,909 B1 * | 11/2001 | Giboney | ............. | G02B 6/4201 257/700 |
| 6,394,666 B1 * | 5/2002 | Minamino | ........... | G02B 6/4231 385/90 |
| 6,741,778 B1 * | 5/2004 | Chan | .................... | G02B 6/4231 385/52 |
| 7,177,504 B2 * | 2/2007 | George | .................. | G02B 6/241 385/49 |
| 7,729,581 B2 * | 6/2010 | Rolston | ............... | G02B 6/4232 385/49 |

(Continued)

OTHER PUBLICATIONS

Barwicz et al., Assembly of Mechanically Compliant Interfaces between Optical Fibers and Nanophotonic Chips. The 64th Electronic Components and Technology Conference (ECIC 2014). Orlando, Florida. Presentation. May 27-30, 2014. 14 pages.

(Continued)

*Primary Examiner* — Daniel Petkovsek
(74) *Attorney, Agent, or Firm* — Wolf, Greenfield & Sacks, P.C.

(57) ABSTRACT

A photonic integrated circuit (PIC) coupled to a substrate may be aligned with receptacles having guide pin structures configured to receive guide pins attached to a fiber assembly. The receptacles may be affixed to a surface of the substrate and/or the PIC to permit the fiber assembly to be removed during a solder reflow process while maintaining the alignment of the fiber assembly to the PIC when reconnected following the solder reflow process.

13 Claims, 9 Drawing Sheets

(56) References Cited

U.S. PATENT DOCUMENTS

| | | | |
|---|---|---|---|
| 7,914,210 B2* | 3/2011 | Schweiker | G02B 6/4212 |
| | | | 385/53 |
| 8,588,561 B2* | 11/2013 | Zbinden | G02B 6/4232 |
| | | | 385/14 |
| 8,611,716 B2* | 12/2013 | DeMeritt | G02B 6/4214 |
| | | | 385/130 |
| 9,134,490 B2* | 9/2015 | Feng | G02B 6/4243 |
| 9,250,404 B2* | 2/2016 | Lim | G02B 6/4249 |
| 9,651,745 B2* | 5/2017 | Chou | G02B 6/4231 |
| 2003/0034438 A1* | 2/2003 | Sherrer | G02B 6/4274 |
| | | | 250/216 |
| 2004/0042729 A1 | 3/2004 | Zhou et al. | |
| 2013/0156365 A1* | 6/2013 | Barwicz | G02B 6/30 |
| | | | 385/14 |
| 2013/0308898 A1 | 11/2013 | Doerr et al. | |
| 2014/0147079 A1 | 5/2014 | Doerr et al. | |
| 2014/0153601 A1 | 6/2014 | Doerr et al. | |
| 2015/0063747 A1 | 3/2015 | Chen et al. | |

OTHER PUBLICATIONS

Maj et al., Light on Board Technology Overview$^{TM}$: Implementation of High-Speed Optical Interconnects Integrated into Semiconductor Integrated Circuit (IC) Packages. Reflex Photonics, Inc. White Paper. Apr. 2006 4 pages.

* cited by examiner

OPTOELECTRONIC PACKAGE WITH PLUGGABLE FIBER ASSEMBLY

RELATED APPLICATIONS

This Application claims the benefit under 35 U.S.C. § 119(e) to U.S. Provisional Patent Application Ser. No. 62/100,980, filed Jan. 8, 2015 and entitled "OPTOELECTRONIC BGA PACKAGE WITH PLUGGABLE FIBER ARRAY," which is hereby incorporated herein by reference in its entirety.

BACKGROUND

Photonic integrated circuits (PICs) include optical components fabricated on a silicon substrate. Often one or more optical fibers are coupled to the PIC to deliver optic signals to and from the PIC. The optical fiber(s) may be edge-coupled to the PIC, or coupled to a surface of the PIC.

BRIEF SUMMARY

According to an aspect of the application, an apparatus is provided, comprising a substrate, a photonic integrated circuit (PIC) coupled to the substrate, and a receptacle coupled to the substrate and/or the PIC, wherein the receptacle includes a guide pin structure configured to receive a guide pin of a fiber assembly including a plurality of optical fibers, wherein the receptacle is aligned with the PIC such that the plurality of optical fibers in the fiber assembly are aligned with the PIC when the guide pin of the fiber assembly is inserted into the guide pin structure of the receptacle.

According to an aspect of the application, a method is provided, comprising coupling a photonic integrated circuit (PIC) to a substrate, aligning a plurality of receptacles, each of which includes a guide pin structure, with the PIC, and coupling the plurality of receptacles to the substrate and/or the PIC after aligning the plurality of receptacles with the PIC.

The foregoing summary is provided by way of illustration and is not intended to be limiting.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION OF INVENTION

Figure 1:
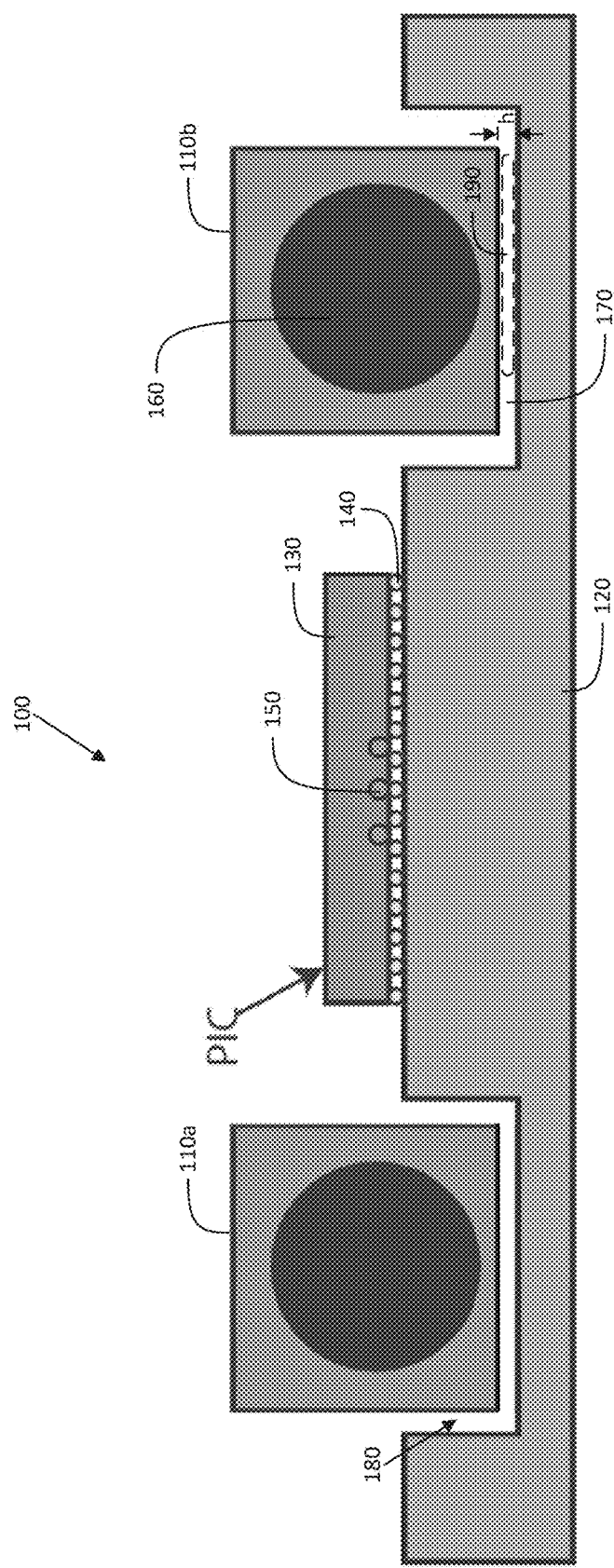
FIG. 1 illustrates a schematic of receptacles arranged relative to surfaces of trenches formed in a package assembly substrate in accordance with some embodiments.

Aspects of the present application provide apparatus and methods for aligning optical fibers of a fiber assembly to a PIC with precision sufficient for single mode optical fiber devices. The inventors have recognized and appreciated that conventional techniques for aligning optical fibers of a fiber assembly with a PIC do not allow for pluggable connections that offer high precision alignment suitable for single mode fiber devices, nor do they offer direct coupling of the optical fibers of a fiber assembly to the PIC. High precision pluggable connections may be desirable to facilitate packaging of a PIC with e.g., a ball grid array (BGA) package. The inventors have recognized and appreciated that conventional techniques for packaging PICs are not practical when it is desired to co-package a PIC and electrical circuitry operating in connection with the PIC, such as drivers and/or application specific integrated circuits (ASICs). ASICs and drivers may be packaged in BGA packages, and such packages can be surface mounted on printed circuit boards (PCBs). BGA packages allow for easy attachment of components to a PCB with hundreds of electrical connections. Yet, packaging using BGAs typically involves performing solder reflow, by placing the PCB and any components to be mounted thereon in an oven. The components are exposed to temperatures sufficiently high (e.g., up to 260° C.) to achieve the desired solder reflow. A typical lead-free solder used is SAC (Sn, Ag, Cu). Moreover, it may be desirable to mount many components on a PCB, providing only small gaps between components. Any optical fibers associated with a PIC may make close spacing of components on a PCB difficult. The fibers may catch on other components being placed on the PCB, and may be broken off during the placement of the packaged PIC or when passing through the oven. Moreover, the component is usually picked from a waffle pack and placed onto the PCB by a high-speed machine. Having fibers dangling from the component would make this impractical. Moreover, the temperatures experienced in the oven during the solder reflow process may damage the optical fibers, for instance by damaging any coating on the fibers, and the precise alignment accuracy of the optical fibers needed for a single-mode connection may not be maintained through such as process. Thus, co-packaging a PIC with electronic circuitry in a package compatible with solder reflow processes may be difficult.

Therefore, aspects of the application provide apparatus and methods for aligning a removable fiber assembly with the PIC that can be unplugged from the package during a solder reflow process. Following the solder reflow process, the fiber assembly may be recoupled to the package. When recoupled, the optical fibers in the fiber assembly may retain sufficient alignment with the PIC for single-mode fiber connections. In some embodiments, the optical fibers in the removable fiber assembly are directly connected to optical fiber connections on the PIC without intervening optical components such as waveguides or short flexible connecting fibers, as discussed in more detail below.

The aspects and embodiments described above, as well as additional aspects and embodiments, are described further below. These aspects and/or embodiments may be used individually, all together, or in any combination of two or more, as the application is not limited in this respect.

FIG. 1 shows a side-view schematic of a package assembly 100 that includes receptacles 110a, 110b for receiving guide pins of a fiber assembly in accordance with some embodiments. The techniques described herein for aligning a fiber assembly with a PIC coupled to a package assembly substrate are described in the context of using a BGA package assembly. However, it should be appreciated that alignment techniques in accordance with some embodiments are not limited for use with BGA package assemblies, and the alignment techniques are also applicable to packaged PIC using other types of packages including, but not limited to, a gold-box package.

Package assembly 100 includes a substrate 120 coupled to a PIC 130 via a ball grid array (BGA) 140. PIC 130 includes one or more optical fiber connections 150 to which optical fibers in a fiber assembly may be connected. The optical fiber connections 150 may be integrated waveguides in some embodiments. As shown, PIC 130 includes three optical fiber connections 150, however it should be appreciated that the PIC may include any number of optical fiber connections including a single connection, as aspects of the present application are not limited in this respect.

Package assembly 100 also includes receptacles 110a, 110b, each of which includes a guide pin structure 160 configured to receive a guide pin attached to a fiber assembly. Guide pin structure 160 is shown in FIG. 1 as a large circular hole formed in the receptacle, and may be considered a hole, a recess, a depression, an indentation, or other suitable receiving feature. However, other shapes and sizes may also be used, and aspects of the present application are not limited in this respect. Additionally, although package assembly 100 includes two receptacles, any suitable number of receptacles (e.g., three, four, five, etc.) may alternatively be used. Receptacles 110a, 110b may be formed of any suitable material including, but not limited to, plastics, metal, and glass.

Receptacles 110a, 110b may be separated from the surface of substrate 120 by a gap 170 having a height "h" to permit movement of the receptacles during alignment of a fiber assembly when connected to package assembly 100, as described in further detail below. Following alignment of the fiber assembly, receptacles 110a, 110b may be fixed in place to prevent further movement using an adhesive and/or one or more support structures, examples of which are described in more detail below.

In some embodiments, substrate 120 includes a plurality of trenches 180 in which receptacles 110a, 110b are located to align the centers of the guide pin structures 160 with the centers of the optical fiber connections 150. That is, in some embodiments the centers of the guide pin structures 160 are co-linear with the centers of the optical fiber connections 150. In practice, the depth accuracy of the trenches 180 may be controllable to within approximately +/10 μm, which may result in too much variation to provide sufficiently precise alignment of single mode fibers, as discussed in more detail below. During an alignment process, described in more detail below, receptacles 110a, 110b may be moved in the vertical direction (up and down in FIG. 1) to align optical fibers in a fiber assembly (not shown) with the optical fiber connections 150 on the PIC to within an accuracy needed for connecting single-mode fibers to the PIC. For example, the accuracy required for aligning single-mode fibers to optical fiber connections 150 on a PIC may be +/−1 μm, or even greater. By contrast, the accuracy required for connecting multi-mode fibers may be less stringent, on the order of +/10 μm. The inventors have recognized and appreciated that it is difficult to maintain the precise alignment needed for connecting single-mode optical fibers to a PIC during a solder reflow process when the fibers remain attached to the PIC during the solder reflow process. Accordingly, in some embodiments, the optical fibers are disconnected from the PIC during a solder reflow process, as described in more detail below.

Figure 2:
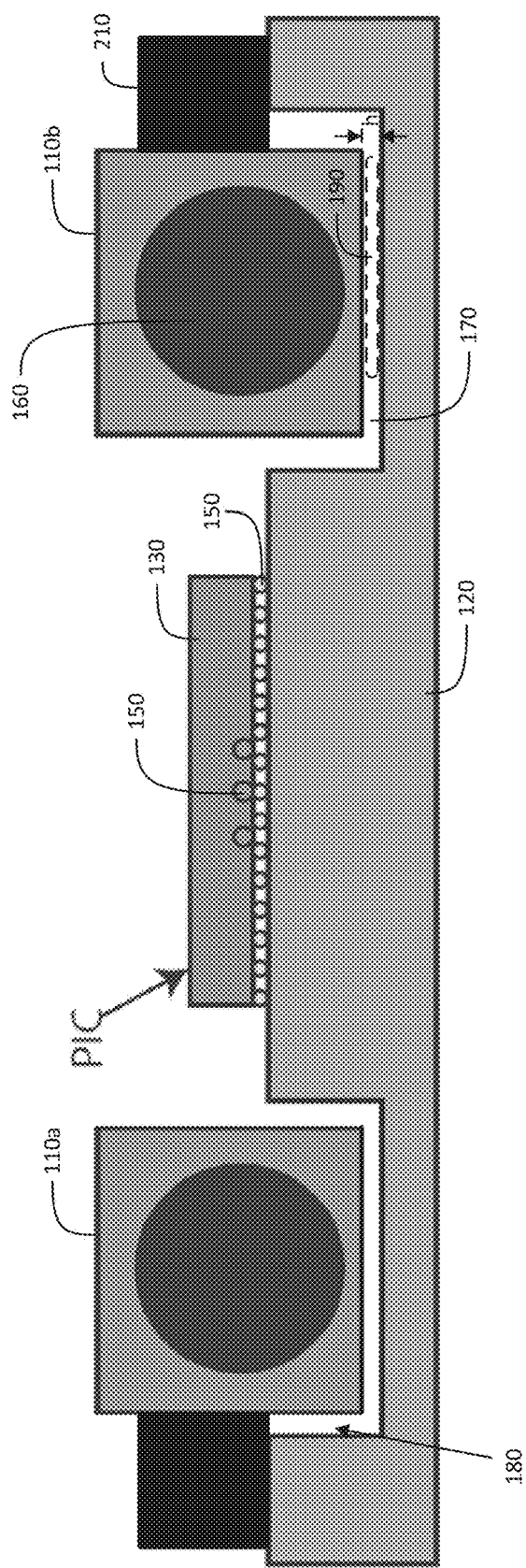
FIG. 2 illustrates a schematic of receptacles indirectly coupled to surfaces of trenches formed in a package assembly substrate using support structures in accordance with some embodiments.

Following alignment, receptacles 110a, 110b may be coupled to the substrate 120 to prevent further movement of the receptacles. In some embodiments, an adhesive 190, such as a thin layer of epoxy may be formed in the gap 170 between a bottom surface of the receptacle and the bottom surface of trench 180. In other embodiments, the receptacles may be welded or soldered to the substrate. FIG. 2 shows an alternate technique for coupling receptacles 110a, 110b to the substrate 120. A support structure 210 is coupled to substrate 120 (e.g., using an adhesive, welding, or soldering) and is provided adjacent to receptacle 110b. Prior to alignment of the fiber assembly (an example of which is shown in connection with FIG. 6A and described below) with the optical fiber connections 150, support structure 210 and receptacle 110b are not coupled to enable the receptacle to move in a vertical direction to facilitate alignment of optical fibers in a fiber assembly to optical fiber connections 150 on PIC 130. Following alignment, receptacle 110b may be coupled to support structure 210 by, for example, applying an adhesive to the vertical surface between receptacle 110b and support structure 210. Accordingly, in some embodiments receptacles 110a, 110b may be indirectly coupled to substrate 120 via one or more support structures 210.

Some adhesives (e.g., epoxy) used to couple components of the package assembly may shrink during curing and may expand with increasing temperature, resulting in a misalignment of the receptacles 110a, 110b relative to the PIC when the package assembly is subjected to different temperatures. Use of indirect coupling of the receptacles to the substrate using a support structure 210 may at least partially mitigate such misalignments when the package assembly is subjected to temperature changes by using very thin adhesive layers (e.g., between support structure 210 and receptacle 110b, between support structure 210 and substrate 120, etc.) that are less susceptible to the temperature changes.

Support structure 210 is shown in FIG. 2 as a support block arranged between a vertical (up and down direction in FIG. 2) surface of receptacle 110b and a horizontal surface of substrate 120 located outside trench 180. It should be appreciated that any other suitable shape or arrangement of support structure(s) may alternatively be used to couple receptacle 110b to substrate 120, and aspects of the present application are not limited in this respect. For example, support structure 210 may alternatively be arranged between the opposite vertical surface of receptacle 110b and a horizontal surface of substrate 120 located inside trench 180 (i.e., between receptacle 110b and PIC 130. Support structure 210 may be formed using any suitable material including, but not limited to, glass (e.g., Pyrex) having a thermal coefficient of expansion matching silicon.

In the embodiments described in connection with FIGS. 1 and 2, the receptacles are arranged in trenches formed in the substrate to permit alignment of the center of the guide pin structures 160 with the center of the optical fiber connections 150 of PIC 130. In an alternative arrangement shown in FIG. 3, receptacles 110a, 110b are arranged on the surface of substrate 120 without forming a trench in the substrate. In this configuration, the centers of the guide pin structures 160 in the receptacles are offset with respect to the centers of the optical fiber connections 150 on PIC 130.

Figure 3:
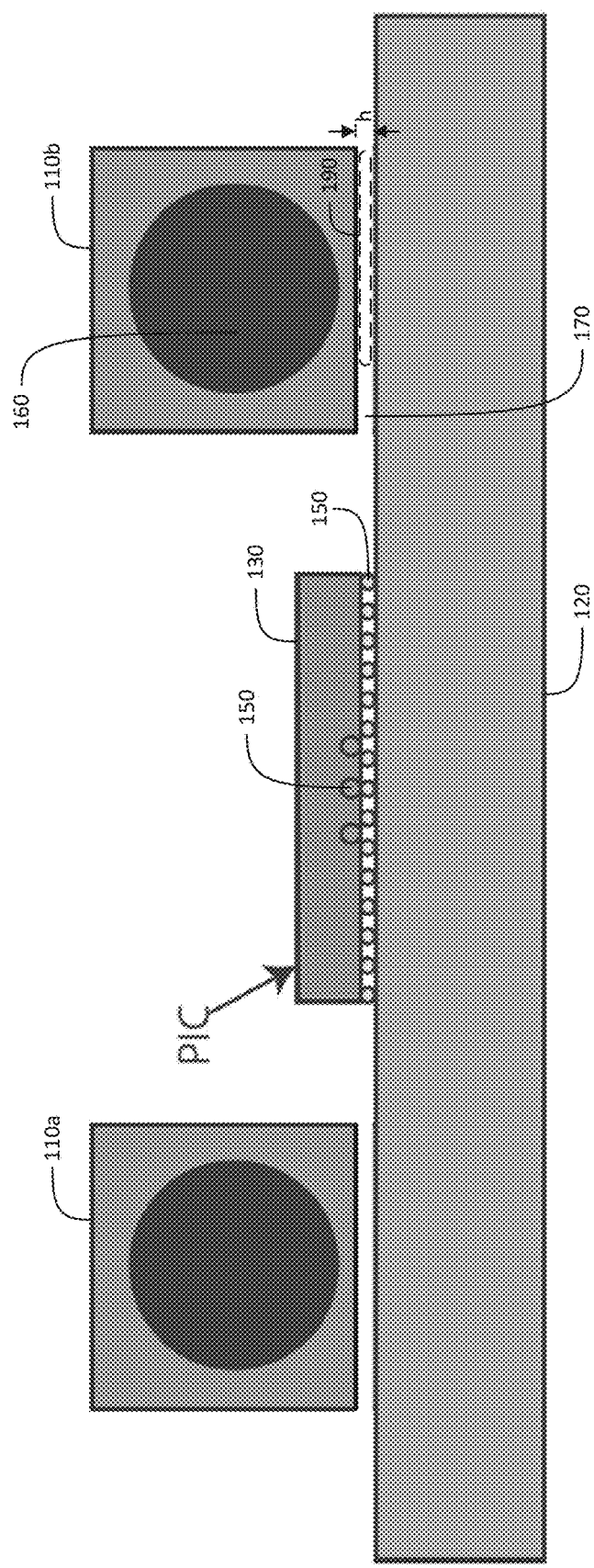
FIG. 3 illustrates a schematic of receptacles arranged relative to the surface of a package assembly substrate in accordance with some embodiments.

As described above for the configuration of FIGS. 1 and 2, receptacles 110a, 110b may be separated from substrate 120 by a gap 170 to permit alignment of the receptacles relative to the PIC. In some embodiments, gap 170 may be smaller in the configuration of FIG. 3 compared to the configuration of FIGS. 1 and 2 due to the variation in trench depth (e.g., +/−10 µm, associated with the limitations in the control of trench etching with conventional etch technologies) in the configuration of FIGS. 1 and 2 that is not present in the configuration of FIG. 3. Following alignment, the receptacles may be coupled to the substrate 120 by providing an adhesive in gap 170, using a support structure (not shown) such as support structure 210 to indirectly couple the receptacles to the substrate, or using any other suitable technique for preventing the movement of receptacles after they are aligned. Because of the smaller gap 170 achievable when a trench in the substrate is not used, a thinner layer of adhesive may be formed in gap 170 which may mitigate, at least partially, the expansion/shrinkage limitations discussed above when coupling the receptacles directly to the substrate. In such embodiments, a separate support structure 210 may not be needed.

Figure 4:
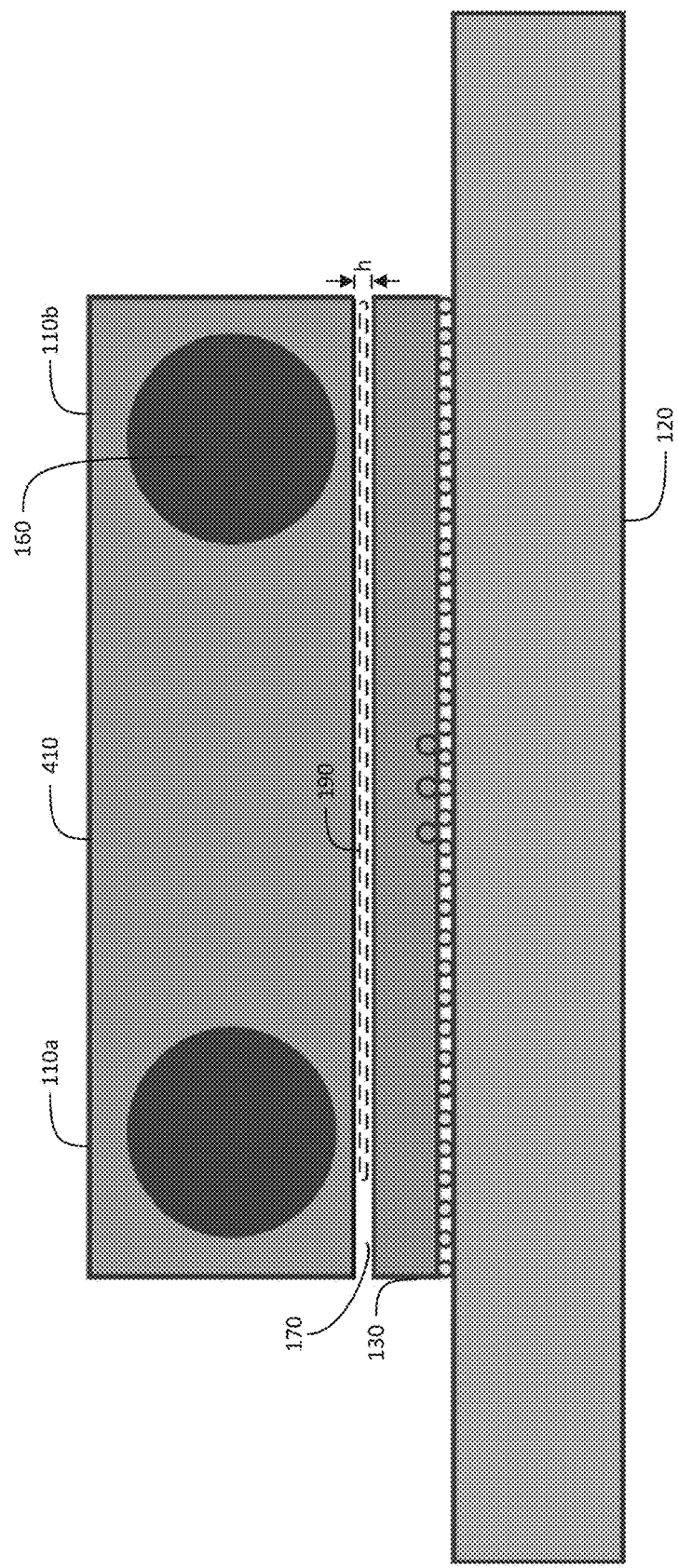
FIG. 4 illustrates a schematic of receptacles arranged relative to the surface of a photonic integrated circuit (PIC) in accordance with some embodiments.

In each of the embodiments shown in FIGS. 1-3, the receptacles are coupled, either directly or indirectly to the substrate 120. FIG. 4 shows an alternate embodiment in which receptacles 110a, 110b are coupled to the PIC 130 rather than substrate 120. Also, as shown, receptacles 110a and 110b may be part of a single structure in the embodiment of FIG. 4, rather than being two separate receptacle structures. As described above, some components of the package assembly may expand or shrink upon exposure to different temperatures in accordance with the coefficient of thermal expansion (CTE) of the material used for the component. The CTE of BGA packages is generally very large in order to match the CTE of the printed circuit board to which the BGA package is soldered. Accordingly, the substrate of the BGA package may expand when subjected to heat during soldering, which may result in misalignments of the receptacles relative to the PIC when the receptacles are coupled directly or indirectly to the substrate. Such misalignments may be mitigated, at least in part, by coupling the receptacles directly or indirectly to the PIC rather than to the substrate, an example of which is illustrated in FIG. 4.

Coupling the receptacles 110a, 110b directly or indirectly to the PIC 130 permits flexibility in the design and arrangement of the receptacles that may not be achievable when the receptacles are coupled directly or indirectly to the substrate 120. For example, the width of the PIC 130 is generally governed by the minimum distance between the receptacles 110a, 110b when the receptacles are coupled to the substrate 120. However, when the receptacles are coupled to the PIC, the receptacles may be arranged at any desired distance and configuration. Additionally, receptacles 110a, 110b may be formed on a single integrated structure 410, which can be manipulated during alignment, as shown in FIG. 4. Alternatively, the receptacles may be formed as separate structures that can be manipulated together or independently during alignment, as discussed in connection with FIGS. 1-3. In some embodiments, the receptacles may be spaced wider than the width of the PIC 130, and one or more support structures may be coupled to substrate 210 and extend upward for coupling to the receptacle following alignment of the fiber assembly.

Figure 5:
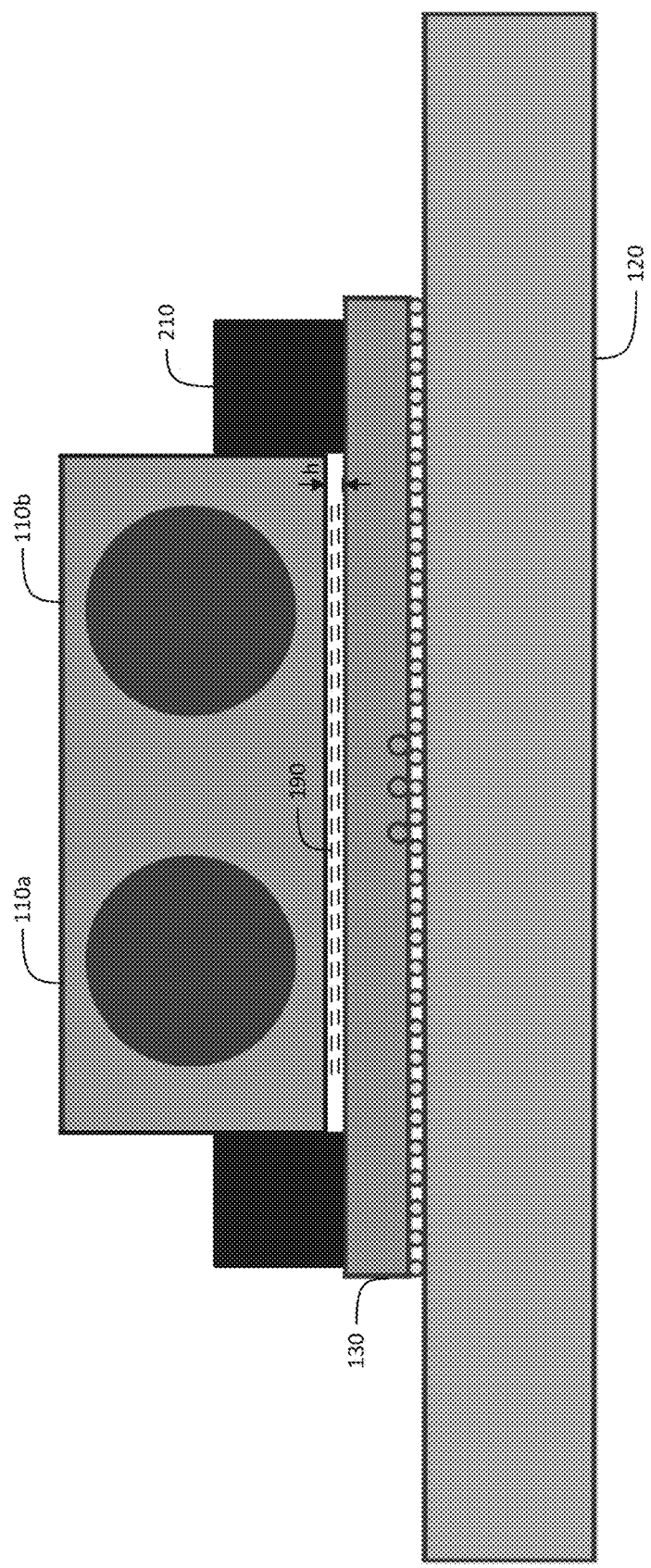
FIG. 5 illustrates a schematic of receptacles indirectly coupled to the surface of a photonic integrated circuit (PIC) using support structures in accordance with some embodiments.

FIG. 5 illustrates an embodiment in which receptacles 110a, 110b are indirectly coupled to PIC 130 using support structures 210. Support structures 210 may be coupled to PIC 130 using any suitable adhesive, examples of which are discussed above in connection with FIG. 2. As discussed above, coupling of receptacles 110a, 110b to PIC 130 provides flexibility in the design and/or arrangement of the receptacles. For example, in embodiments where the receptacles are indirectly coupled to PIC 130 using an integrated structure, only a single support structure 210 may be needed to couple multiple receptacles to the PIC.

Figure 6A:
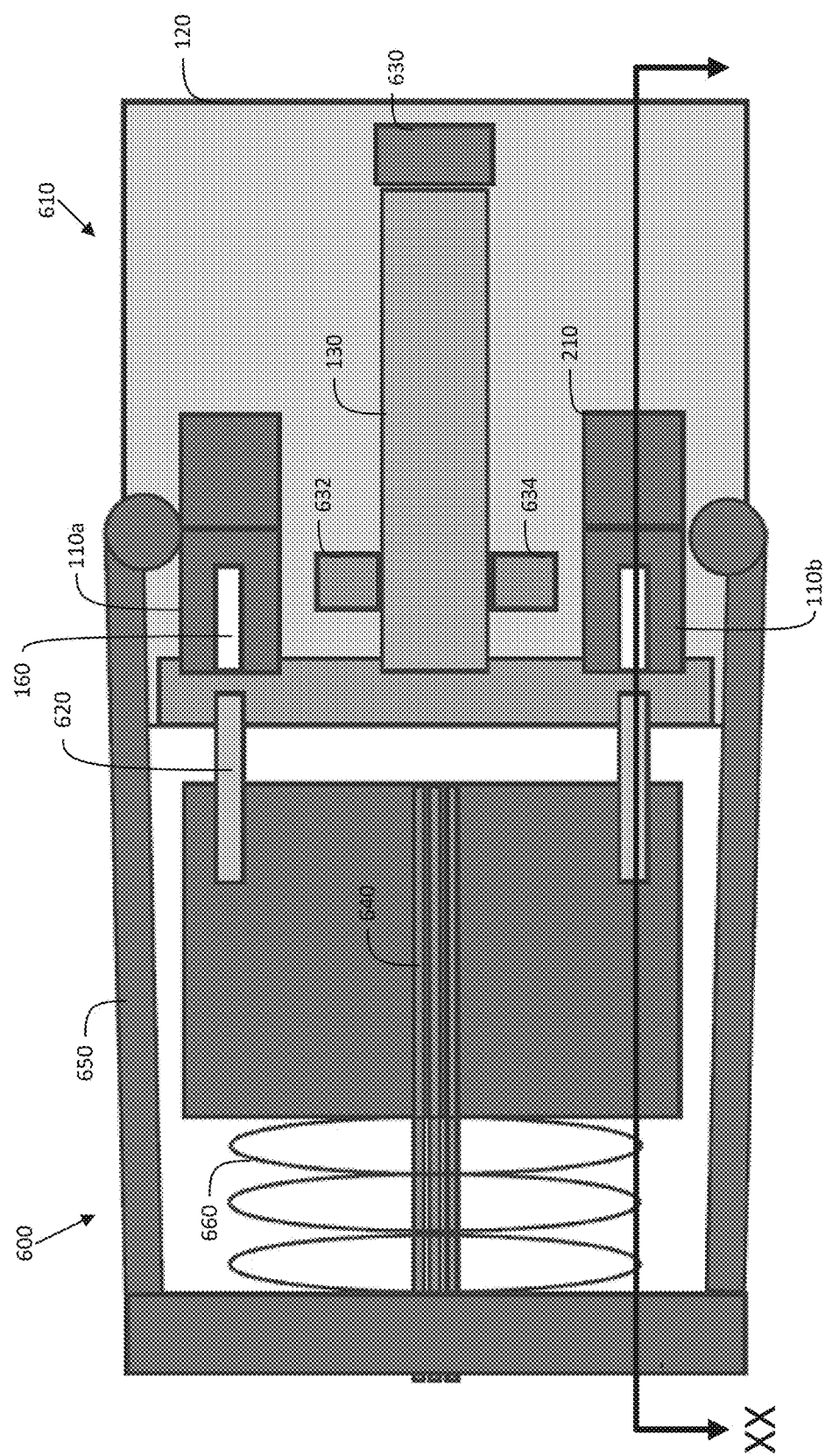
FIGS. 6A and 6B illustrate top and side views, respectively, of an optical module that includes a fiber assembly and a packaged PIC in accordance with some embodiments.

FIG. 6A illustrates a top view of an optical module including a fiber assembly 600 disconnected from and arranged near a package assembly 610 in accordance with some embodiments. As shown, package assembly 610 includes PIC 130, receptacles 110a, 110b, substrate 120, and support structure 210 for indirectly coupling receptacle 110b to substrate 120 as discussed above in connection with FIG. 3. Each of receptacles 110a, 110b includes a guide pin structure 160, which enables a fiber assembly to connect with package assembly 610 using guide pins 620. Guide pins 620 may be formed of any suitable material including, but not limited to, metal and ceramic. As shown, package assembly 610 also includes electronics components 630, 632, and 634 coupled to substrate 120. Fiber assembly 600 includes a plurality of optical fibers 640 configured to connect to optical fiber connections (not shown) on PIC 130. Fiber assembly 600 also includes clip 650 that engages with the sides of support blocks 210 when the fiber assembly is connected to the package assembly to hold the fiber assembly against the PIC when it is plugged in. In the state illustrated in FIG. 6A, the clip is disengaged or only partially engaged (not fully engaged) with the package assembly 610. This should be appreciated since the guide pins 620 are not slotted within the guide pin structure 160 and the optical fibers 640 are not contacting the PIC 130. To fully engage the clip, it may be moved to the right in the scenario of FIG. 6B, toward the PIC 130, and the rounded ends of the clip 650 may fit securely around the right-side edges of support blocks 210 (in the view of FIG. 6A).

Fiber assembly 600 further includes spring 660 that produces tension to secure the fiber assembly to the package assembly when connected. Components for securing the fiber assembly 600 to the package assembly 610 other than or in addition to spring 660 and clip 650, such as snapping or locking components may alternatively be used. In some embodiments, fiber assembly 600 may be temporarily and reversibly secured to package assembly 610 such that the fiber assembly may be disconnected or "unplugged" when desired. This may be beneficial in various scenarios, such as those in which it is desired to place the PIC 130 and BGA through an oven for a solder reflow process without exposing the optical fibers to such an environment. In other embodiments, fiber assembly 600 may be permanently secured (e.g., with an adhesive) to package assembly 610 following alignment of the optical fibers 640 of the fiber assembly with the PIC 130, as described above.

Figure 6B:
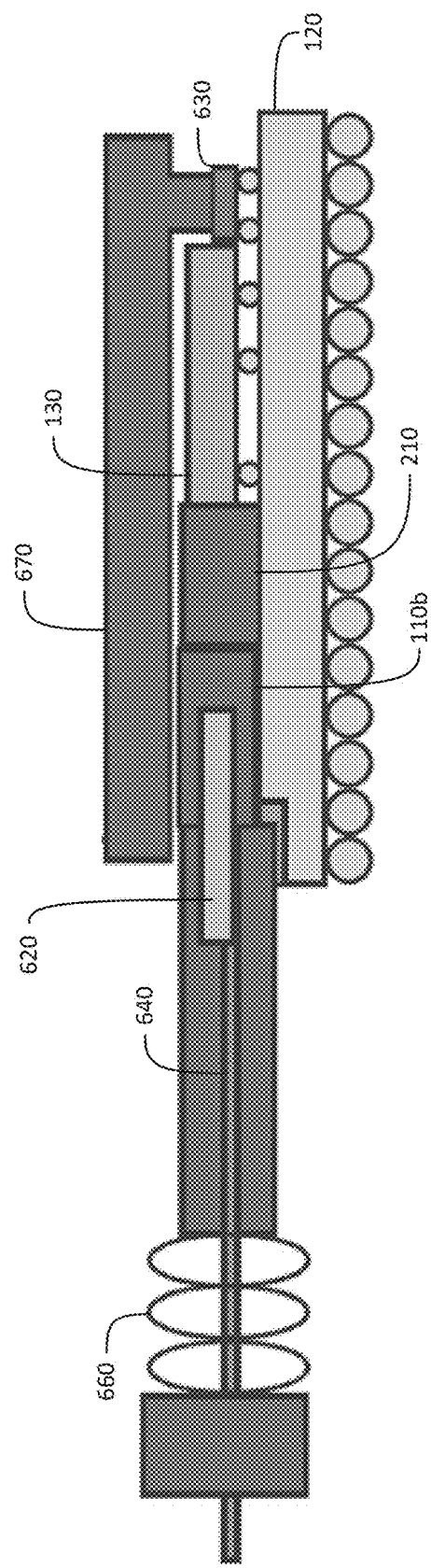

FIG. 6B illustrates a side view of the fiber assembly 600 and package assembly 610 taken as a cross section XX through the top view of the optical module shown in FIG. 6A in which the guide pins 620 of the fiber assembly have been inserted into the guide pin structures 160 of the package assembly. As shown in FIG. 6B, receptacle 110b may be coupled to substrate 120 via support block 210. Also shown in FIG. 6B is a cover 670 or "lid" coupled to package assembly 610 that overlays the guide pin connection between guide pin 620 and the guide pin structure 160 of receptacle 110*b*. Cover 670 may protect this connection to prevent the fiber assembly from becoming unplugged when connected. In some embodiments, cover 670 provides heat dissipation for components on the substrate 120.

Figure 6C:
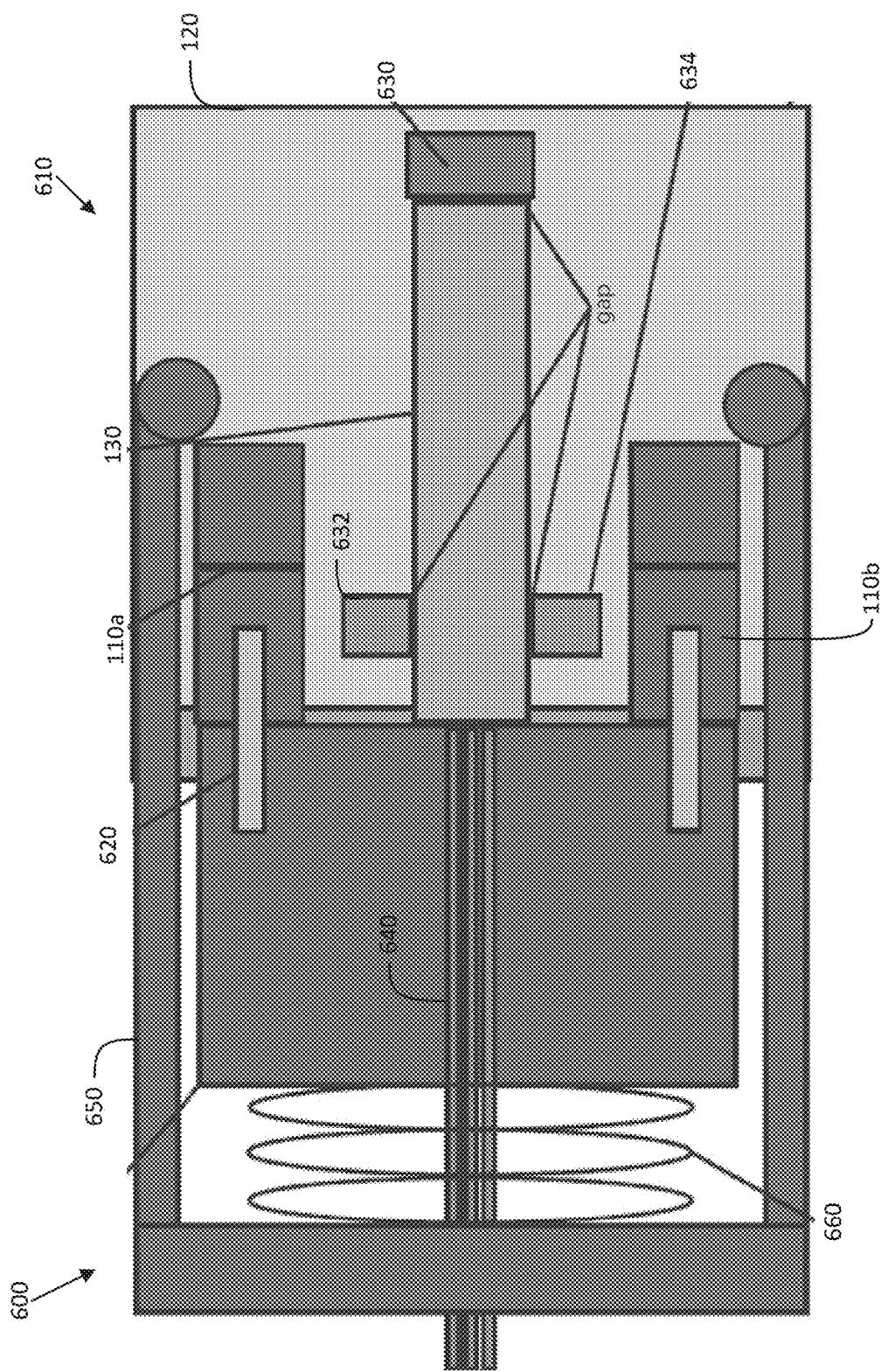
FIG. 6C illustrates the optical module of FIG. 6A in which the fiber assembly and the packaged PIC are directly connected.

FIG. 6C shows the optical module of FIG. 6A in which the fiber assembly 600 is connected to package assembly 610. As shown in FIG. 6C, according to embodiments of the present application the optical fibers of a fiber assembly may be directly connected to the waveguides or other optical fiber connections 150 of a PIC. The connection may be "direct" in that there may be no intermediate waveguides or optical fibers, although it is possible that epoxy or other material may in some embodiments be disposed between the optical fibers of the fiber assembly and the optical fiber connections 150 of the PIC. Such a configuration simplifies alignment of optical fibers of a fiber assembly with a PIC, and thus may also improve alignment accuracy and device performance.

Figure 7:
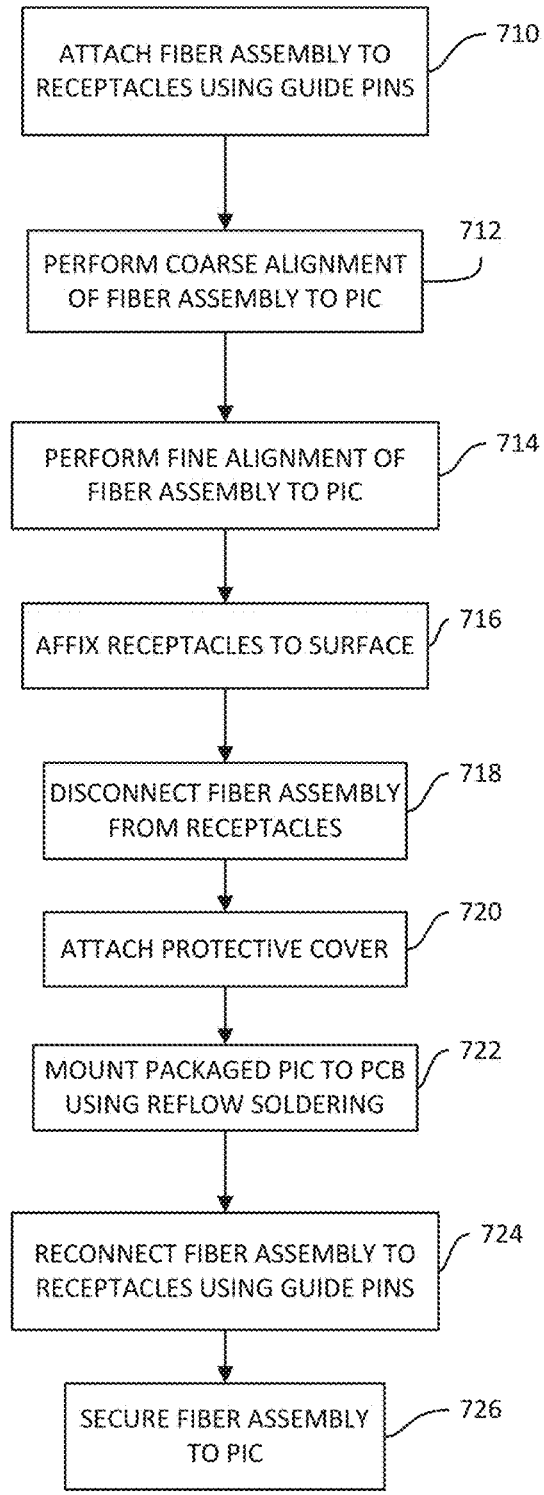
FIG. 7 shows a flowchart of a process for aligning receptacles with a PIC to which a pluggable fiber array may be attached in accordance with some embodiments.

FIG. 7 illustrates an exemplary process for aligning a pluggable fiber assembly with a PIC mounted to a package assembly in accordance with some embodiments. In act 710, the fiber assembly is attached to receptacles, such as receptacles 110*a* and 110*b* using guide pins. The guide pins may be attached to the fiber assembly and may be inserted into guide pin structures (e.g., holes) in the receptacles. Alternatively, the guide pins may be attached to the receptacles and may be inserted into guide pin structures formed in the fiber assembly. A reversible attachment technique may be used to attach the receptacles to the fiber assembly for alignment to enable the fiber assembly to be removed following alignment. The process then proceeds to act 712, where a coarse alignment of the fiber assembly to a PIC mounted on a package assembly is performed. For example, one or more optical fibers of the fiber assembly may be connected to corresponding optical fiber connections on the PIC.

After the fiber assembly has been coarsely aligned, the process proceeds to act 714, where a fine alignment of the fiber assembly to the PIC is performed by adjusting the position of the receptacles (and the connected fiber assembly) relative to the PIC. The fiber assembly may be aligned using any suitable alignment technique, and aspects of the present application are not limited in this respect. In some embodiments, an active alignment technique is employed in which an optical signal is sent along one or more optical fibers of the fiber assembly and the matching between the optical fiber(s) and the corresponding optical fiber connection(s) on the PIC are analyzed. During active alignment, the light coupling between one or more optical fibers and the PIC may be maximized to ensure proper single mode performance. In other embodiments, a passive alignment technique is employed that uses one or more cameras to determine the location of the optical fibers relative to the optical fiber connections on the PIC without the use of an optical signal. A mechanical gripper or other suitable alignment system may be connected to the fiber assembly to achieve a precise alignment sufficient to support connection of single-mode optical fibers in the fiber assembly to the PIC.

After alignment of the fiber assembly, the process proceeds to act 716, where the receptacles are affixed to a surface of the package assembly. In some embodiments, the receptacles may be directly coupled to the surface of the substrate of the package assembly and/or the PIC coupled to the substrate of the package assembly by forming a thin layer of adhesive (e.g., epoxy) in a gap between the receptacle and the surface. In other embodiments, the receptacles may be indirectly coupled to the surface of the substrate and/or the surface of the PIC by coupling the receptacles to a support structure coupled to the surface. As described above, indirect coupling of the receptacles to the surface may at least partially mitigate thermal expansion/shrinking challenges that may occur when the receptacles are directly coupled to the substrate.

In some embodiments, the surface to which the receptacles are affixed is an interposer formed on the substrate of the package assembly. The interposer may be used to route electrical signals between the PIC and electrical components formed on the substrate. For example, interposers may be used to maximize the connection density of the electric path between the PIC and various electrical components.

Following coupling of the receptacles to a surface of the package assembly, the process proceeds to act 718, where the fiber assembly is disconnected from the receptacles by disengaging the guide pins from the guide pin structures in the receptacles. The process then proceeds to act 720, where a protective cover is attached to the package assembly by inserting guide pins on the protective cover into the guide pin structures in the receptacles. The protective cover functions to protect the optical fiber connections on the PIC during a reflow soldering process, as discussed in more detail below. Any suitable protective cover may be used, and aspects of the present application are not limited in this respect.

After the protective cover has been attached, the process proceeds to act 722, where processes including reflow soldering to mount the packaged PIC or other components on a printed circuit board (PCB) are performed. Because the optical fiber assembly has been removed and the optical fiber connections on the PIC have been protected, the high temperatures experienced during mounting processes such as reflow soldering are less likely to affect the alignment and performance of single mode optical fibers in the fiber assembly when reattached to the optical fiber connections following the mounting processes.

After the packaged PIC and other components have been mounted on a PCB using reflow soldering, the process proceeds to act 724, where the fiber assembly is reconnected to the receptacles affixed to the package assembly mounted on the PCB by inserting the guide pins on the fiber assembly into the guide pin structures in the receptacles.

The process then proceeds to act 726, where the fiber assembly is reversibly or permanently secured to the packaged PIC. In some embodiments, it is desirable to design a fiber assembly that can be plugged and unplugged into the packaged PIC for handling, testing, or the purposes. For example, following mounting of the packaged PIC on a PCB, the fiber assembly may be plugged into the packaged PIC and tested. When the packaged module tests successfully, the fiber assembly may be permanently secured by, for example, placing adhesive on the fiber assembly and/or the PIC and curing the adhesive.

The aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Aspects of the present application provide simplicity in surface mounting a packaged PIC on a PCB when it is desired to have a single-mode optical fiber coupled to the PIC. Aligning and removing the optical fibers during a reflow soldering process prevents the fibers from being subjected to temperatures sufficiently high to cause damage to the fibers.

Aspects of the present application facilitate co-packaging of PICs and drivers and/or ASICs. The aspects described herein allow for PICs having pluggable optical fiber connections to be packaged in BGA packages or other packages compatible with packaging conventional electronic integrated circuits (EICs). Thus, a PIC and EIC may be packaged together.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. An apparatus, comprising:
    a substrate including a trench;
    a photonic integrated circuit (PIC) including an optical device, the PIC being disposed on a first surface portion of the substrate, wherein the PIC includes one or more optical ports located at an edge of the PIC;
    a receptacle disposed in the trench of the substrate, wherein the receptacle includes a guide pin structure configured to receive a guide pin of a fiber assembly including a plurality of optical fibers, wherein the receptacle is aligned with the PIC such that the one or more optical ports are aligned to optically edge-couple, through the edge of the PIC, to the plurality of optical fibers in the fiber assembly when the guide pin of the fiber assembly is inserted into the guide pin structure of the receptacle; and
    a support structure, wherein the receptacle is coupled to a second surface portion of the substrate via the support structure, the first and second surface portions being substantially co-planar.

2. The apparatus according to claim 1, wherein the receptacle and the support structure are separate pieces.

3. The apparatus according to claim 1, wherein the receptacle is coupled to the substrate using an adhesive formed in a gap between a surface of the receptacle and a surface of the trench.

4. The apparatus according to claim 1,
    wherein the support structure has a first surface coupled to the receptacle and a second surface coupled to the second surface portion of the substrate.

5. The apparatus according to claim 4, wherein the second surface of the support structure is disposed, at least partially, outside the trench.

6. The apparatus according to claim 1, wherein the support structure is disposed, at least partially, outside the trench.

7. The apparatus according to claim 1, wherein the one or more optical ports include ends of respective integrated waveguides.

8. The apparatus according to claim 1, wherein the PIC is electrically connected to the substrate through a ball grid array.

9. The apparatus according to claim 1, further comprising an interposer having a first surface proximate the substrate and a second surface opposite the first surface and proximate the PIC.

10. The apparatus according to claim 1, further comprising:
    the fiber assembly including the plurality of single-mode optical fibers, wherein the plurality of single-mode optical fibers are directly connected to the PIC when the guide pin of the fiber assembly is inserted into the guide pin structure of the receptacle.

11. The apparatus of claim 1, wherein the receptacle is a first receptacle, and the trench is a first trench, wherein the substrate includes a second trench and the apparatus comprises a second receptacle disposed in the second trench of the substrate.

12. The apparatus of claim 11, wherein the guide pin structure is a first guide pin structure and the guide pin is a first guide pin, wherein the second receptacle includes a second guide pin structure configured to receive a second guide pin of the fiber assembly.

13. The apparatus of claim 11, wherein a spacing between the first and second receptacles is adjustable.

* * * * *